A. Burnham,
Cage Trap.
Nº 38,558.    Patented May 19, 1863.
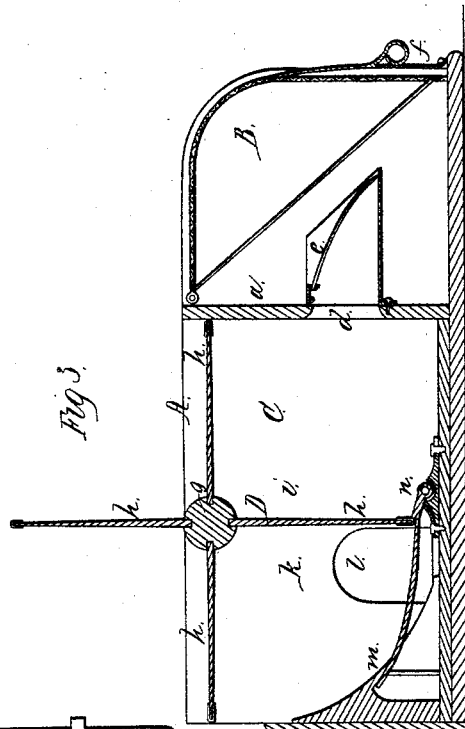
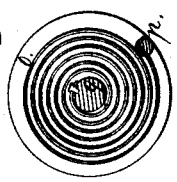
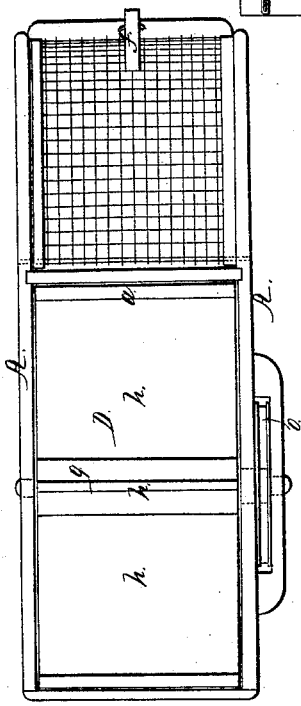
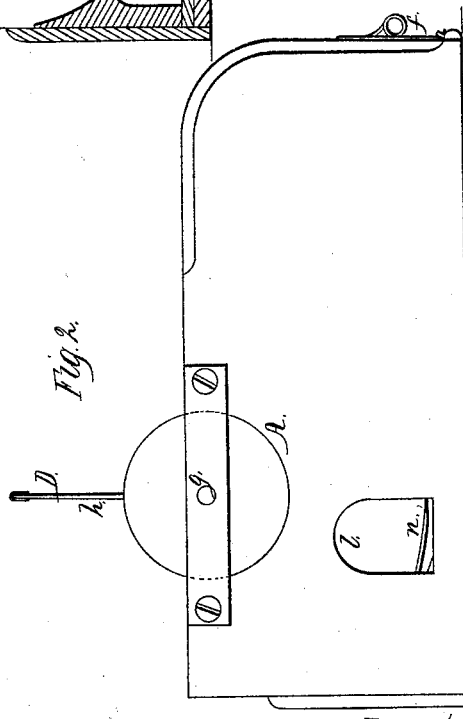
Witnesses:
Inventor:

UNITED STATES PATENT OFFICE.

ALONZO BURNHAM, OF MONTAGUE, MASSACHUSETTS.

IMPROVEMENT IN ANIMAL-TRAPS.

Specification forming part of Letters Patent No. 38,558, dated May 19, 1863.

*To all whom it may concern:*

Be it known that I, ALONZO BURNHAM, of Montague, in the county of Franklin and State of Massachusetts, have invented an Improved Trap for Entrapping Rats, Mice, or other Animals; and I do hereby declare the same to be fully described in the following specification and represented in the accompanying drawings, of which—

Figure 1 is a top view, Fig. 2 a side elevation, and Fig. 3 a vertical and longitudinal section, of such trap.

In the drawings, A denotes a long box, which, by a vertical partition, $a$, is divided into two chambers, B C. The rearmost chamber—viz., B, which I term the auxiliary trap or trapping apartment—has a throat or entrance, passage, $d$, which leads into it from the front chamber, C, and has an inclined gravitating grated door or gate, $e$. The top and rear end of the chamber B may be formed of wire net-work, as shown in the drawings, and may be hinged to the rest of the chamber, so as to open as a door thereto, and be provided with a spring-catch, $f$, for holding it down when closed. The front chamber, C, is about double the length of the rear one B, and contains a rotary trapper, D, composed of a horizontal shaft, $g$, and four rectangular or square wings, $h\ h\ h\ h$, extending radially from such shaft and at right angles to each other, as shown in Figs. 1 and 3. This trapper D is so arranged in the box A that any two of its blades or wings shall constitute the top of the front chamber, C, while that wing which is below them shall divide the said chamber into two parts or separate apartment, $i\ k$. The foremost of these chambers—viz., $k$—has a doorway, $l$, made through either one or each of its opposite sides and contains a sweep or curved board, $m$, which extends from the upper part of the chamber down to the bottom thereof, as shown in Fig. 3. A spring catch-lever, $n$, is also arranged within the lower part of the chamber C and underneath the trapper D, as shown in Fig. 3. The shaft of the trapper has a coiled spring, $o$, wound around it, one end of the said spring being fastened to the shaft while the other end is fixed to a stationary pin, $p$, the same being as shown in Fig. 4, which is a vertical section of the spring, the shaft, and pin. By rotating the trapper so that its upper wing shall move toward the chamber B the spring $o$ will be wound up, and on removing from the trapper the power by which it may be so operated the lower wing of the trapper will be caught by the catch-lever $n$. This catch-lever is provided with a spring, $r$, for forcing it upward.

Under the above construction and arrangement of parts, an animal on entering the trap will be likely to step on the catch-lever and depress it. The instant he may have accomplished this the trapper will be relieved and its coiled spring will set it smartly in rotation, so as to cause it to strike the animal and force him into the rearmost part of the chamber C, the lowermost of the wings of the trapper being subsequently brought up against the shoulder $s$ of the spring-catch, and thereby stopping further rotation of the trapper until the spring-catch may be again depressed. The animal, on finding himself imprisoned within the space between the sides of the box and two of the wings of the trapper, will naturally endeavor to escape by rushing through the throat $d$, and underneath the grated door $e$, which he will force upward in passing through the passage, and into the rear chamber or auxiliary trap, B, the said door falling back to its place by gravity. Under this condition of the parts the trap will be reset ready for the entrapment of another animal.

It should be observed that in the construction and arrangement of my improved trap an animal will not only be struck and driven backward or toward the chamber B by the rotary trapper, but will be imprisoned within the trapper prior to passing into and through the throat of the chamber B. In this way the animal is simply crowded back and imprisoned without being likely to be materially injured or wounded so as to bleed.

The trapper is so constructed and arranged in the chamber C that an animal, while being struck and crowded or thrown back toward the auxiliary chamber B, cannot be thrown out of the trap.

In the trap which constitutes the subject of Patent No. 25,179, and which I do not claim as my invention, the rotary trapper does not perform the function of imprisoning an animal in a chamber prior to his entrance into the auxiliary trap. It is likely to throw him away from the trap rather than into it. This results from the peculiar arrangement of the trapper, the trap-door, and the chamber which is separated from the space in which the trapper works.

I am aware that a rotary trapper provided with two wings, a rotating spring, and a catch-platform, has been applied to a box or chamber, so as to make part of the boundary or sides thereof, and therefore I do not claim such.

What I claim as my invention, and desire to secure by Letters Patent, is—

My improved trap, having its rotary trapper D, the chamber C thereof, the sweep $m$, at the front of such chamber, the entrance passage or passages $l$, the catch-lever $n$, and the auxiliary trapping-chamber B, with the throat $d$ and gravitating gate or door $e$, combined or arranged, and made in manner and so as to operate substantially as hereinbefore specified.

ALONZO BURNHAM.

Witnesses:
R. H. EDDY,
F. P. HALE, Jr.